(12) United States Patent
Keevill et al.

(10) Patent No.: US 8,204,543 B2
(45) Date of Patent: Jun. 19, 2012

(54) LOCAL AREA CELLULAR BASESTATION

(75) Inventors: Peter Keevill, Bath (GB); William Franks, Pewsey (GB); Richard Byrne, Thatcham (GB); Andrea Giustina, Milan (IT)

(73) Assignee: Ubiquisys Limited (GB)

( * ) Notice: Subject to any disclaimer, the term of this patent is extended or adjusted under 35 U.S.C. 154(b) by 434 days.

(21) Appl. No.: 11/664,425

(22) PCT Filed: Jul. 28, 2006

(86) PCT No.: PCT/GB2006/002819
§ 371 (c)(1),
(2), (4) Date: Apr. 7, 2008

(87) PCT Pub. No.: WO2007/015067
PCT Pub. Date: Feb. 8, 2007

(65) Prior Publication Data
US 2009/0017864 A1 Jan. 15, 2009

(30) Foreign Application Priority Data

Aug. 1, 2005 (GB) .................................. 0515888.6
May 30, 2006 (GB) .................................. 0610650.4

(51) Int. Cl.
*H04M 1/00* (2006.01)
*H04W 4/00* (2009.01)
(52) U.S. Cl. .................. 455/561; 455/552.1; 455/556.1; 455/426.1; 455/426.2
(58) Field of Classification Search .................. 455/558, 455/552.1, 561, 556.1, 41.2, 459, 426.1, 455/426.2
See application file for complete search history.

(56) References Cited

U.S. PATENT DOCUMENTS

| 5,438,608 | A | 8/1995 | Kojima |
| 5,778,322 | A | 7/1998 | Rydbeck |
| 5,794,157 | A | 8/1998 | Haartsen |
| 6,014,563 | A | 1/2000 | Szabo |
| 6,236,859 | B1 | 5/2001 | Morper |
| 6,351,638 | B1 * | 2/2002 | Robinson ...................... 455/418 |

(Continued)

FOREIGN PATENT DOCUMENTS
CN 1643816 7/2005
(Continued)

OTHER PUBLICATIONS

PCT/GB2006/002819, International Search Report and Written Opinion, dated Feb. 23, 2007.

(Continued)

*Primary Examiner* — Un C Cho
(74) *Attorney, Agent, or Firm* — Weaver Austin Villeneuve and Sampson LLP

(57) ABSTRACT

A base station for a cellular wireless communications network has a first interface, enabling connection with a remote communications device using a cellular wireless communications protocol in the cellular wireless communications network. The base station also has a second interface, enabling connection over a wide area network, and a third interface, enabling connection over a local area network. Software enables communication over the wide area network between a remote communications device, connected to the first interface, and a core network of the cellular wireless communications network. Software can also enable the remote communications device to communicate with a device in the local area network, or with a server in the wide area network, without using the core network of the cellular wireless communications network.

23 Claims, 4 Drawing Sheets

U.S. PATENT DOCUMENTS

| | | | |
|---|---|---|---|
| 6,615,035 B1 | 9/2003 | Lucidarme et al. | |
| 6,901,061 B1 | 5/2005 | Joo et al. | |
| 7,058,415 B2 * | 6/2006 | Bushnell et al. | 455/461 |
| 7,266,393 B2 * | 9/2007 | Latva-Aho et al. | 455/561 |
| 7,308,255 B2 * | 12/2007 | Loveland | 455/414.1 |
| 2001/0044305 A1 | 11/2001 | Reddy et al. | |
| 2002/0089951 A1 | 7/2002 | Hyun et al. | |
| 2002/0165000 A1 | 11/2002 | Fok | |
| 2002/0191561 A1 | 12/2002 | Chen et al. | |
| 2003/0058818 A1 | 3/2003 | Wilkes et al. | |
| 2003/0119489 A1 | 6/2003 | Mohammed | |
| 2004/0017786 A1 | 1/2004 | Shively | |
| 2004/0204097 A1 | 10/2004 | Scheinert et al. | |
| 2005/0037766 A1 | 2/2005 | Hans et al. | |
| 2005/0088999 A1 | 4/2005 | Waylett et al. | |
| 2006/0052085 A1 | 3/2006 | Gregrio Rodriguez et al. | |
| 2006/0211448 A1 * | 9/2006 | Reiss et al. | 455/553.1 |

FOREIGN PATENT DOCUMENTS

| | | |
|---|---|---|
| DE | 196 33 925 | 3/1998 |
| EP | 0 766 427 | 4/1997 |
| EP | GB 2 321 158 | 7/1998 |
| EP | 1 032 236 | 8/2000 |
| EP | 1 049 340 | 11/2000 |
| EP | 1 267 524 | 12/2002 |
| EP | 1267524 A2 | 12/2002 |
| EP | 1 650 907 | 4/2006 |
| GB | 2 355 885 | 5/2001 |
| JP | H09-135479 | 5/1997 |
| JP | A 2001-197557 | 7/2001 |
| JP | A 2003-274011 | 9/2003 |
| JP | 2005-345574 | 12/2005 |
| WO | WO 01/76276 | 11/2001 |
| WO | WO 02/054820 | 7/2002 |
| WO | WO 02/073883 | 9/2002 |
| WO | WO 02/093811 | 11/2002 |
| WO | WO 03/019971 | 3/2003 |
| WO | WO 03/028344 | 4/2003 |
| WO | WO 03/032616 | 4/2003 |
| WO | WO 03/061177 | 7/2003 |
| WO | WO 03/063404 | 7/2003 |
| WO | WO 03/084096 | 10/2003 |
| WO | WO 03/085992 | 10/2003 |
| WO | WO 03/090013 | 10/2003 |
| WO | WO2004/086788 | 10/2004 |
| WO | WO 2005/057968 | 6/2005 |
| WO | WO 2005/107195 | 11/2005 |
| WO | WO 2005/112410 | 11/2005 |
| WO | WO 2005/114918 | 12/2005 |
| WO | WO 2005/114920 | 12/2005 |
| WO | WO 2006/005999 | 1/2006 |

OTHER PUBLICATIONS

GB0807816.4 Search and Examination Report dated Jun. 26, 2008.
GB0807816.4 Search and Examination Report dated Jul. 2, 2008.
Examination Report dated Sep. 12, 2008 for related European Patent Application No. 06 765 153.9-2412.
JP Office Action dated Nov. 4, 2011, Patent Application No. 2008-524576.
CN First Office Action dated Jan. 26, 2011, CN App No. 200680036511.2.
CN Second Office Action dated Dec. 21, 2011, CN App No. 200680036511.2.

* cited by examiner

LOCAL AREA CELLULAR BASESTATION

This invention relates to a cellular basestation, and in particular to a basestation for a cellular communications network, that can conveniently be used to provide a cellular service, for example within a home or office.

Wide area cellular services for standards such as GSM and UMTS are generally provided from conventional basestations, which are capable of covering a large area (cell radius of many kilometres). However, coverage within buildings can be more challenging because of the RF attenuation of the building structure and radio shadowing effects from surrounding buildings. This coverage problem becomes more difficult for standards aiming to support medium to high speed data such as EDGE and UMTS, because of the higher signal-to-noise figures required for signals using high-order constellations or low spreading factors. Higher frequencies, such as those used for UMTS, also accentuate the problem, because these signals suffer greater attenuation through building structures.

Conventional solutions to these problems would be to deploy many more basestations and RF repeater systems to increase coverage within buildings and urban areas. These solutions become prohibitively costly and the additional aesthetic impact of many more basestations in populated areas creates objections from residents and additional legal expenses for operators. The use of short-range radio interfaces such as WiFi or Bluetooth to handle cellular traffic within a home or office is an alternative approach, but requires the customer or operator to invest in new handsets.

Recent figures suggest over 70% of all cellular calls are made within buildings so this issue presents some significant obstacles to the future growth of the cellular industry.

It is known to provide a wireless access point, for example in accordance with the IEEE 802.11 standard, which allows a computer user to make a wireless connection to a computer network, such as the internet, in order to be able to access data.

However, this type of wireless access point has the limitation that it does not allow access by any of the very large number of existing cellular mobile communications devices.

US2004/0204097 discloses a low power basestation, for establishing a small area of wireless coverage within a macrocell network, for example within a building such as a customer's home or office. This basestation may be connected into a conventional wireless network infrastructure by means of an existing IP connection within the home or office.

However, this has the limitation that the user is able to use his mobile communications device only within that wireless network.

According to a first aspect of the present invention, there is provided a base station for a cellular wireless communications network, comprising:
  a first interface, enabling connection with a remote communications device using a cellular wireless communications protocol in the cellular wireless communications network;
  a second interface, enabling connection over a wide area network; and
  a third interface, enabling connection over a local area network,
  and further comprising:
    software for enabling communication over the wide area network between a remote communications device, connected to the first interface, and a core network of the cellular wireless communications network; and
    software for enabling communication over the local area network between a remote communications device, connected to the first interface, and a device connected to the local area network, without passing traffic through the core network of the cellular wireless communications network.
    software to enable centralised management of the basestation which is making use of spectrum common to other basestations in a wide area public network This has the advantage that the user is able to communicate with a device connected to the local area network, without needing to pass traffic through the core network of the cellular wireless communications network, and thus reducing the load on the core network.

Preferably, the base station in accordance with the invention uses a part of the radio frequency spectrum that is shared with other base stations in the cellular wireless communications network. These base stations may serve macrocells, microcells, picocells, or even "femtocells", in the public, wide area network.

Preferably, the base station is able to perform ciphering of communications with the remote communications device through the first interface.

Preferably, the cellular wireless communications network includes a management node, which is able to define the or each device, connected to the local area network, with which the remote communications device connected to the first interface is able to communicate without passing traffic through the core network of the cellular wireless communications network.

According to a second aspect of the present invention, there is provided a base station for a cellular wireless communications network, comprising:
  a first interface, enabling connection with a remote communications device using a cellular wireless communications protocol in the cellular wireless communications network; and
  a second interface, enabling connection over a wide area network;
  and further comprising:
    software for enabling communication over the wide area network between a remote communications device, connected to the first interface, and a core network of the cellular wireless communications network; and
    software for enabling communication over the wide area network between a remote communications device, connected to the first interface, and a network server connected to the wide area network to allow data to be downloaded from said computer to the remote communications device without passing traffic through the core network of the cellular wireless communications network.

This has the advantage that the user is able to communicate with a device connected to the wide area network, without needing to pass traffic through the core network of the cellular wireless communications network.

Preferably, the base station is able to perform ciphering of communications with the remote communications device through the first interface.

Preferably, the cellular wireless communications network includes a management node, which is able to define the or each network server, connected to the wide area network, with which the remote communications device connected to the first interface is able to communicate without passing traffic through the core network of the cellular wireless communications network.

DETAILED DESCRIPTION OF PREFERRED EMBODIMENTS

Figure 1:
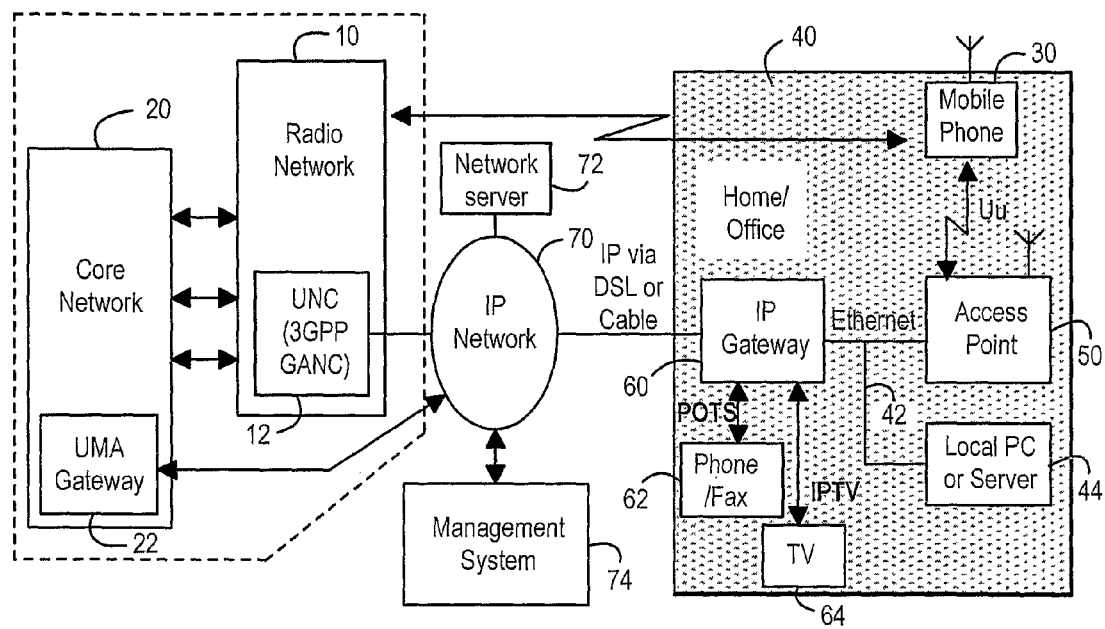
FIG. 1 is a block schematic diagram of a system incorporating a basestation in accordance with the present invention.

FIG. 1 is a block schematic diagram, illustrating a system architecture. A mobile network operator (MNO) owns and operates a wireless communications network, including a radio network 10, including a network of cellular basestations (not shown), and a core network 20, having a connection into the fixed telephone network. These are generally conventional, except as described below.

A mobile phone 30, when roaming in the territory covered by the wireless communications network, is able to establish a wireless connection with one of the cellular basestations, in order to communicate with other telephones in the fixed telephone network, or with other mobile phones, which have established their own wireless connections with a cellular basestation, and hence with the fixed telephone network.

In accordance with the present invention, there is provided, for example within a home or office 40 or in another location where additional wireless coverage is required, a further basestation, or access point, 50. This access point 50 is provided for use by the owner of the premises where it is located, but is integrated into the wireless communications network. That is, the access point shares the part of the radio frequency spectrum allocated to that wireless communications network, by having allocated to it, either permanently or temporarily, some of the group of channels. This group of channels is thus shared with other basestations, which may serve macrocells, microcells, picocells, or even "femtocells", in the public, wide area network. As a result, the mobile phone 30 can roam from the access point 50 to another basestation when leaving the immediate vicinity of the access point 50, or can roam to the access point 50 from another basestation when returning to the immediate vicinity of the access point 50.

The access point 50 therefore acts as a basestation within the relevant wireless communications network. For example, it can allow an entirely conventional and unmodified mobile phone 30 or other user device to establish a connection for voice and/or data services using GSM/GPRS and/or UMTS air interfaces. Of course, the access point 50 can be enabled to establish connections with the mobile phone 30 using the standard air interface of any suitable cellular wireless communications system.

The access point 50 has a connection for an Ethernet Local Area Network (LAN) 42, within the home or office 40. As shown in FIG. 1, the access point 50 can connect over the Ethernet LAN 42 to one or more local PCs or servers 44.

The access point 50 can connect over the Ethernet LAN 42 to an IP gateway device 60. The IP gateway device 60 provides an IP connection over an IP network 70, for example the internet, to the MNO network either via a Digital Subscriber Line (DSL) or via other IP transport methods such as a digital multimedia Cable network. Thus, the existing IP connection from the home or office can be used to provide backhaul from the access point 50. Flexible interfacing to the operator's core network 20 can be provided via connections to either the MNO Core Network or Radio Access Network, using the UMA standard through a UMA gateway 22. This approach enables low-cost transport of data and voice using Voice-over-Internet Protocol (VoIP) techniques.

The connection from the IP gateway 60 over the IP network 70 into the MNO Radio Access Network 10 is provided by a UMA Unlicensed Network Controller (UNC) 12, which has been standardised by 3GPP as a Generic Access Network Controller (GANC). Other non-standardised solutions to interface to the Radio Access Network 10 could also be employed as an alternative approach. Direct connection to the operator's Core Network can be achieved through use of a SIP Interface between the access point and a suitable gateway such as a SIP Gateway or an IP Multimedia Subsystem.

In this illustrated embodiment, the DSL or cable IP gateway device 60 includes provision for connection of a POTS telephone or fax device 62, and audio/video connections for providing IPTV services to a TV 64. The access point 50 includes a services environment which allows these facilities to be integrated into the MNO network, enabling sophisticated new services for users.

In an alternative implementation of the invention, the access point 50 can be integrated as a component within the IP gateway device 60; an internal IP connection then links the embedded access point component to the router functions within the IP gateway device. This configuration can potentially provide a lower overall cost and is convenient for operators looking to provide gateway units which unify data, fixed voice, multimedia and mobile services.

Thus, while the mobile phone 30 is within the home or office 40, or otherwise within the coverage area of the access point 50, it can connect into the MNO network in the same way as via any other basestation in the cellular wireless communications network.

FIG. 1 also shows a network server 72 connected to the IP network 70. As will be appreciated, where the IP network 70 is the internet, a very large number of servers and other devices are connected to the network. As will be described in more detail below, the user of the mobile phone 30 can access such devices by means of the access point 50.

FIG. 1 also shows a management system 74, connected to the IP network 70. The management system 74 is provided by the mobile network operator for managing the operation of the access point 50, including controlling the available services.

For example, as mentioned above, and as described in more detail below, a user of the mobile phone 30 can establish a connection through the access point 50 over the Ethernet LAN 42 to one or more local PCs or servers 44, or through the IP gateway device 60 to another device connected thereto, or through the IP gateway device 60 to a network server 72 connected to the IP network 70. These connections can be established without passing traffic over the core network 20 of the wireless communications network. The management system 74 is able to define the devices, or the IP addresses, with which such connections can be established. Then, these connections can be established with only a restricted number of devices or IP addresses, if desired by the mobile network operator.

Also, the management system 74 is able to specify the channels (which may be defined by frequencies, time slots, and/or spreading codes, depending on the particular cellular wireless communications system) allocated to the access point 50. These channels may be allocated semi-permanently, or may be changed regularly, depending on the requirements of the network as a whole.

Figure 2:
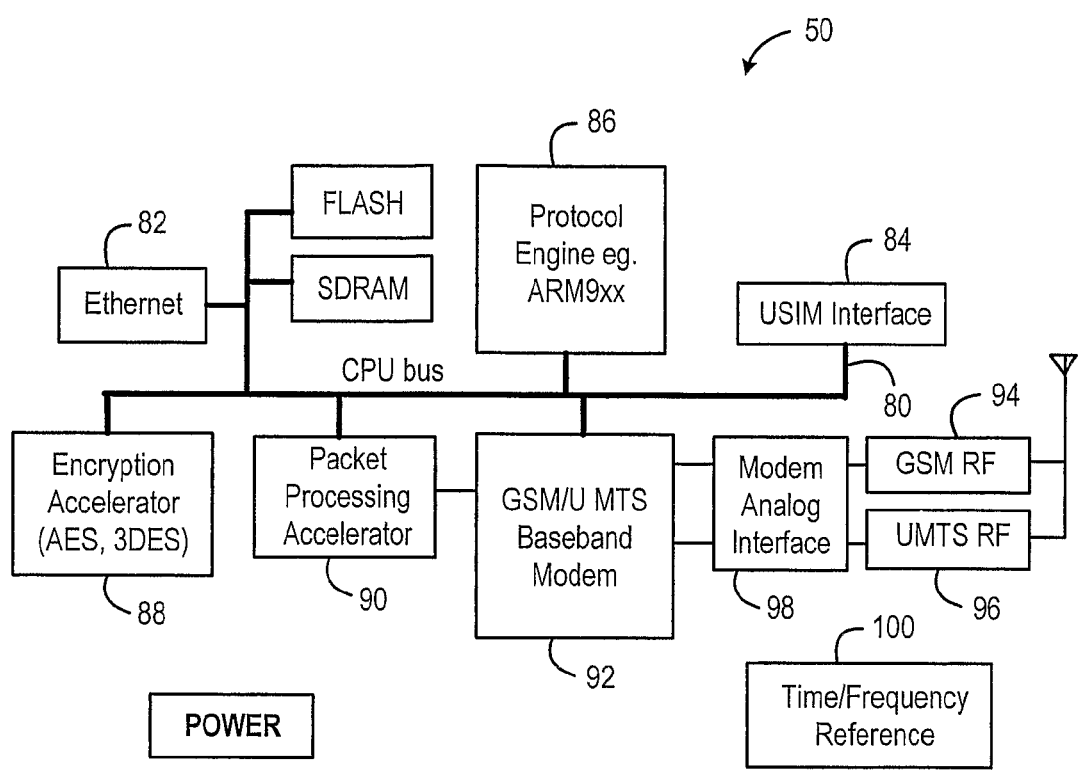
FIG. 2 is a block schematic diagram illustrating the hardware architecture of a basestation in accordance with the present invention.

FIG. 2 is a block schematic diagram, showing the hardware architecture of the access point 50. The architecture consists of a number of functional blocks interconnected by a processor bus 80 such as the ARM AMBA bus.

The access point 50 includes various external wired interfaces, including an RJ45 Ethernet 10/100 interface 82, which provides a connection to a local LAN for connection to the IP gateway device 60 and thence to the MNO network and the Internet, and also provides access to other devices attached to the Ethernet network, such as one or more PC 44, or such as an IPTV 64 for advanced service provision. The access point 50 can therefore have an IP-based interface to the Radio Access Network 10 through adaptation of the standard UMA UNC, or Core Network via SIP as opposed to the usual Iub (UMTS) or Abis (GSM) interfaces.

The access point 50 also includes a UMTS Subscriber Identification Module (USIM) card interface 84 to allow use of a standard UMTS SIM card to provide a unique identifier for the access point 50, in order to identify the unit to the management system 74 and the operator's radio network 10 and core network 20, and thereby enable various services to be provided. GSM SIM or IMS ISIM interfaces could also be used as alternative implementations.

The access point 50 also includes a Protocol Engine 86, implemented as a small embedded CPU such as an ARM926 (with appropriate peripherals) supported by a dedicated co-processor 88 for encryption and a dedicated co-processor 90 for packet processing, which will offload the main CPU for specific intensive tasks. For example, encryption of the IPSec packet payload is handled by the encryption accelerator 88, which supports AES and 3DES encryption protocols. The VPN connection of the access point 50 to the UNC 12 and the management system 74 will make use of the internal encryption processing; user VPN encryption processing may be handled outside the access point 50.

The main CPU is also responsible for the configuration and control, via the main CPU bus 80, of all functional blocks in the system including a baseband modem 92 and the Ethernet port 82. The system software image, including configuration data for all system functional blocks is stored in FLASH memory 94 within the access point 50; two complete system images are stored so that updated system images can be downloaded to the access point 50 from the management system 74, whilst the previous image is retained as a fall back option in case of corrupted download. access point 50

The main CPU peripherals include: watchdog timers for software sanity checking, JTAG and serial ports for in-system debug, and a GPIO for system control including LED status indication, system power management and system alarm gathering.

The access point 50 has a first RF Interface 94 for GSM at either 900 MHz or 1800 MHz and a second RF Interface 96 for UMTS at 2100 MHz. It therefore supports simultaneous operation of GSM and UMTS. For the GSM and UMTS receive paths both uplink (basestation receive) and downlink (terminal receive) frequencies are accessible; for the transmit paths only downlink (basestation transmit) frequencies are available. At installation, the access point 50 selects a downlink RF carrier frequency with the lowest noise/interference for both GSM and UMTS from permitted lists of GSM and UMTS carrier frequencies provided by the management system 74; permitted downlink frequencies will be scanned by the access point 50 with its receive path configured in UE mode and its transmit path disabled.

The access point 50 is designed to provide cellular service over a distance of less than 50 m to stationary or pedestrian (for example, no more than 10 km/h) users within a building, and hence the transmit power required is dramatically reduced compared to a conventional macrocell basestation. However, the functionality described herein can be provided in any basestation, operating at any power level, and handling any type of mobile user.

The RF interfaces 94, 96 are connected through a modem analog interface 98 to the baseband modem 92, which supports sample rate processing, chip-rate processing (UMTS only) and symbol rate processing for the GSM and UMTS basestation modems.

The access point 50 will have limited GSM Mobile Station (MS) and UMTS User Equipment (UE) modem functionality, in order to allow the access point 50 to recover the Broadcast Channel (BCH) from local GSM/UMTS basestations and other nearby access points. UE modem mode will be entered during initial installation to survey the local RF environment and at regular intervals after the initial installation to monitor the RF environment and, if necessary, modify the access point configuration.

The baseband modem 92 is implemented using a software-based architecture to ensure high adaptability over a field life of up to 5 years, for example, being upgradeable to allow future enhancement to HSDPA or EDGE service to be delivered in the field without the need to replace the unit.

The access point 50 includes timing and frequency references 100 which provide sufficient accuracy for GSM and UMTS basestation operation over a 5 year lifetime.

This embodiment of the access point 50 therefore provides various operational features. For example, it is user installable, self-configuring, and adaptive to the surrounding RF environment. Access can be restricted to specified users using standard GSM/UMTS protocols. Further, multiple access point units installed in a large indoor area connected to a common Ethernet LAN can manage handoffs between themselves without the intervention of other systems in the radio network 10 or the core network 20 of the operator's cellular network.

Figure 3:
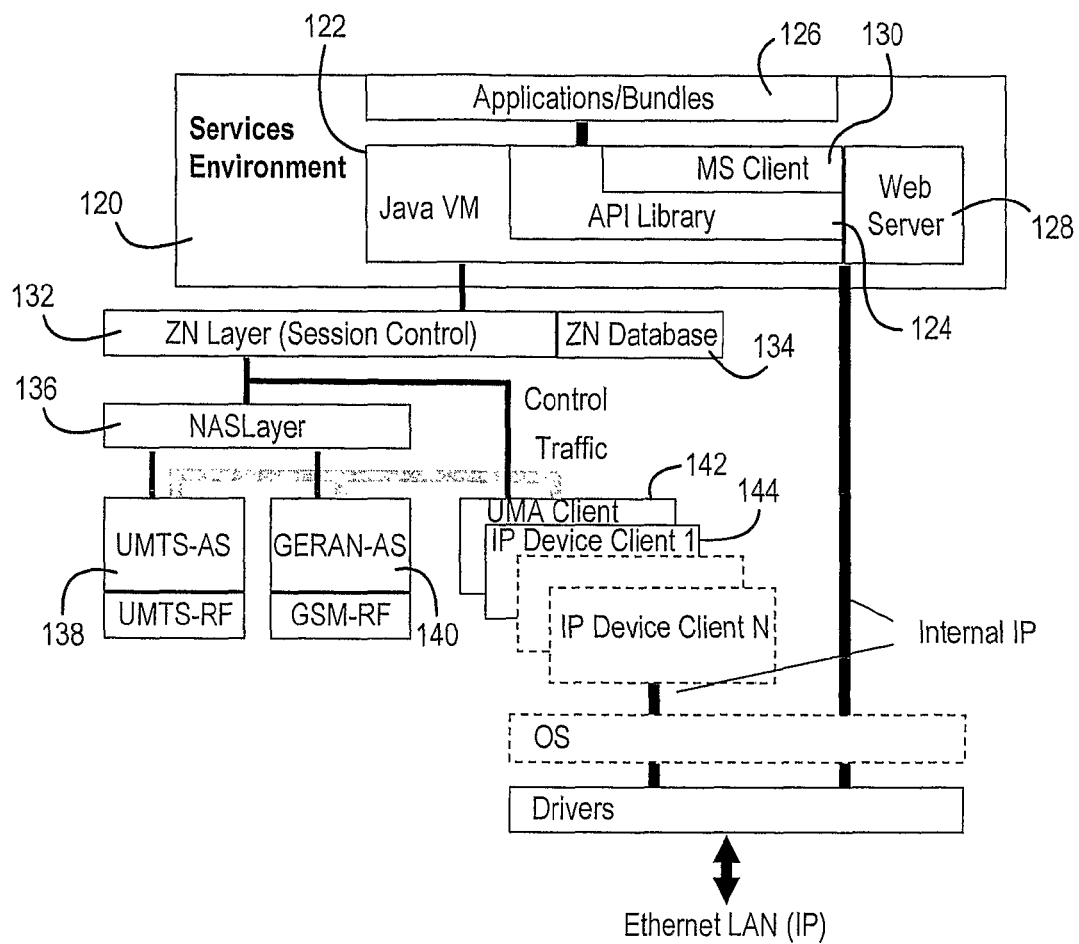
FIG. 3 is a block schematic diagram illustrating the software architecture of a basestation in accordance with the present invention.

FIG. 3 provides a conceptual overview of the architecture of the software running on the protocol engine 86 of the access point 50, together with the encryption accelerator 88 and the packet processing accelerator 90, with an emphasis on the Services Environment and its control paths into the lower stack layers.

The access point 50 includes a services platform, which can exploit the potential of the union of four data networks, namely the external MNO core network 20, the external internet 70, mobile devices such as the mobile phone 30 (via GSM/UMTS), and the home network (via Ethernet).

The access point stack architecture includes a powerful services environment 120. The services environment is Java-based and includes a Java Virtual Machine 122, and an access point library 124, in the form of an API interface which allows applications 126 to interact with the lower layers of the stack to control calls/data sessions, traffic routing and many other functions. The services environment 120 also includes a web server 128, which provides a convenient interface to the user for configuration and monitoring and also for selection and purchase of desired applications, with security protected options for debug and maintenance via a local PC. The services environment 120 also includes a management system (MS) client 130, which configures the access point 50 and monitors various aspects of its operation. The MS client 130 controls the provisioning system so that any component of the software in the system, as shown in FIG. 3, can be replaced and restarted.

As mentioned above, the services environment 120 also includes various applications 126, for example created by the mobile network operator or the IP gateway 60 provider, which can be pre-installed in the access point 50, or can be delivered via download from the operator's network at the operator's initiation or at user request, for example as part of a chargeable service.

A network (ZN) layer 132 of the software provides session control functions to manage and implement the service flows and policies that determine how the access point 50 is configured and operates for any particular Mobile Network Operator (MNO) configuration and end-user settings. Configuration parameters are loaded to the ZN database 134 via the management system (MS) client 130, Java applications or via the Web Server 128. These parameters provide the "rules" for the session control operation within the access point. Session control functions include: implementation of the policies for registration, call control and traffic flow/routing for the access point 50 on the MNO core network; control of the UMA client (to be described further below) for registration, call control and traffic flow; and efficient management of access point ZAP resources in delivering GSM/UMTS services and interacting with other services via the IP gateway 60.

Below the network (ZN) layer 132 of the software, there is the Non Access Stratum (NAS) functionality 136, which is required in order for services to be provided to the UE when the MNO GSM/UMTS core network 20 is not connected to the access point 50. This functionality enables the access point 50 to offer the usual GSM/UMTS services, such as SMS and MMS which mobile users are accustomed to, whilst not being connected to the GSM/UMTS core network in the conventional manner. In order for such services to be offered, the access point 50 contains a condensed subset of the core network functions usually contained in the Mobile Switching Centre (MSC), Serving GPRS Service Node (SGSN), GSM Basestation Subsystem (BSS), and UMTS Radio Network Subsystem (RNS).

The Non-Access Stratum layer 136, as implemented in the access point 50, therefore provides various functions which are typically included in MSC and SGSN nodes within a conventional GSM/UMTS network. One such feature is call control (CC). This supports call establishment between two peer entities, mainly for circuit-switched connections.

The NAS layer 136 also provides session management (SM), for control of packet data sessions; Short Message Service (SMS) function, for transmission of SMS messages between the access point 50 and the network SMS service centre; supplementary services (SS), such as call waiting, call holding, and multi-party calling; Mobility Management/GPRS Mobility Management (MM/GMM), for management of UE mobility elements, such as location registration, authentication, and ciphering; and control functions associated with the USIM card which may be fitted to the access point 50. The access point 50 also provides packet routing capability, which is essentially GGSN functionality in a conventional network.

Below the NAS functionality, there is the Access Stratum functionality, specifically the UMTS Access Stratum functions 138 and the GERAN Access Stratum functions 140.

The UMTS Access Stratum functionality 138 comprises some SGSN functionality, Radio Network Controller (RNC) functionality and an interface to the UMTS physical layer implemented on the baseband modem 92. The RNC and physical layer interface functionality is required for all access point services supporting UMTS, regardless of the core network interface used. In more detail, the Access Stratum functionality comprises the following elements:

Packet Data Convergence Protocol (PDCP)

Header compression and decompression of IP data streams (optional), transfer of user data, maintenance of PDCP sequence numbers (typically part of an SGSN function).

Radio Resources Control (RRC)

Broadcast of information related to the NAS and AS; establishment, maintenance and release of RRC connections; establishment, reconfiguration and release of Radio Bearers and radio resources; RRC connection mobility functions; control of requested QoS; UE measurement reporting and control; outer loop power control; ciphering control.

Radio Link Control (RLC)

Transmission and reception of signaling and data packets, including buffering, segmentation and concatenation of packets. Comprises three entity types, for acknowledged mode, unacknowledged mode, and transparent modes.

Medium Access Control (MAC)

Mapping between logical channels and transport channels, selection of the appropriate Transport Formats for each Transport Channel, priority handling between UEs, multiplexing/demultiplexing of upper layer PDUs to/from transport block (sets) on common and dedicated transport channels.

UMTS Layer 1

Interface to the UMTS modem functions implemented on the Baseband Modem.

The GERAN access stratum functionality 140 comprises BSS and some limited SGSN functionality. The BSS functionality is required for support of all GSM/GPRS/EDGE services, regardless of the interface used between the access point 50 and the MNO core network 20.

The SGSN functionality of the GERAN access stratum functionality 140 comprises the following elements:

Sub-Network Dependent Convergence Protocol (SNDCP)

Multiplexing of several packet data protocols; data compression/decompression (optional); header compression/decompression (optional); segmentation and reassembly.

Logical Link Control (LLC)

LLC provides peer-to-peer unacknowledged and acknowledged data transfer, and the GPRS ciphering functionality.

The BSS functionality of the GERAN access stratum functionality 140 comprises the following elements:

Radio Link Control/Medium Access Control (RLC/MAC)

RLC/MAC supports acknowledged and unacknowledged modes; segmentation and reassembly of LLC PDUs; multiplexing to several physical channels; broadcast of system information.

Radio Resource Management (RR)

RR connection establishment, maintenance, and releases; system information broadcast; packet data resource management.

GSM/GPRS Layer 1

Interface to the GSM/GPRS/EDGE modem functions implemented in the Baseband Modem.

Thus, as described above, the access point 50 includes some functionality typically located in the higher levels of the Radio Access Network for UMTS and GSM standards. This is partly because, in order to be able to route data traffic to the MNO core network, or to the internet or to devices on the local area network, the access point 50 must have access to the data packets flowing to and from the remote devices. However it is highly desirable that the air interface to the cellular devices is secured by the same ciphering mechanisms used in the rest of the cellular network. Therefore, if it is required to maintain this, then, in order to enable the service and routing capabilities described above, the access point 50 should contain the termination function for the air interface ciphering (namely, the RLC/MAC layer in UMTS).

The software running in the access point 50 also includes a UMA client 142, allowing the access point 50 to use the UMA protocol in a non-standard configuration. Specifically, the standard UMA protocol is designed to enable a GSM MS or UMTS UE, which includes a UMA client and an unlicensed spectrum air interface such as IEEE802.11b/g or Bluetooth, to communicate with the GSM/UMTS core network using unlicensed spectrum. However, the implementation in the access point 50 uses the UMA client as part of the network interface of a GSM/UMTS base station, so that the UMA protocols, developed to communicate with a GSM/UMTS core network via an Unlicensed Network Controller (UNC), can be adapted to manage calls handled by that base station, including handover to/from the macro network. As noted previously, a SIP Interface can be used as an alternative approach.

The access point 50 also includes one or more IP device clients 144, to enable the transfer of calls, control information or data between the "mobile domain" (mobile phones camped onto the access point 50 and traffic paths into the MNO core network 20) and other IP devices, such as a VoIP/POTS port within the IP gateway 60 for fixed-line phone/fax services, an AV port within the IP gateway 60 for IPTV and/or video services, PC's or Servers 44 on the local Ethernet LAN, or remote webpages and/or servers 72 accessible over the internet 70 via the IP gateway 60.

Each IP device client 144 has access to the traffic path within the access point 50 and can be controlled by the session controller in the ZN layer 132, which can initiate and terminate calls/data sessions with the accessible IP devices. The inclusion within the access point 50 software architecture of IP device clients which are specific to a particular device or service enables traffic from that particular device or service to be routed within the access point 50, such that it can be connected to the GSM/UMTS mobile devices accessed via the GSM or UMTS Access Strata or the MNO Core Network accessed via the UMA client.

Further, each IP device client 144 has access to the other devices on the LAN, and also has access to other devices accessible over the internet 70. For example, by using the appropriate IP device client 144, a POTS phone connected to the access point 50 can be connected over the internet 70 to another POTS phone, in order to make a voice call.

Moreover, each IP device client 144 also has access to the mobile network of the MNO. Specifically, any device connected to the LAN 42, or any device connected to the IP gateway 60, can have an IP device client 144 that can associate itself with the USIM card connected to the USIM interface 84. From the point of view of the MNO network, any such device then appears to be a mobile, and will be allowed access to the MNO network. As a result, a variety of services can be provided to the user, by providing a device with appropriate desired functionality, and then using the USIM card to allow the device to connect over the MNO core network to one or more other devices.

A further use of the USIM card, connected to the USIM interface 84, is to allow the mobile phones camped onto the access point to work in a similar way to a multi-extension cordless telephone system. In this particular service configuration, the USIM card within the access point 50 carries an IMSI identifier and an MSISDN number which in fact defines a phone number for the home or office within which the access point 50 is installed, although it appears within the mobile network operator's system as a mobile number. When the MSISDN number of the USIM card in the access point 50 is called, all mobile phones camped onto the access point 50 are rung until one of them is answered. In this way, incoming calls to an individual person would be directed to the MSISDN number of that individual's mobile phone, and can therefore be differentiated from calls which are intended for any of the users in that home or office by the MSISDN number which is called. The call handling functionality of the access point 50 then changes when the MSISDN number of the access point itself is called.

Figure 4:
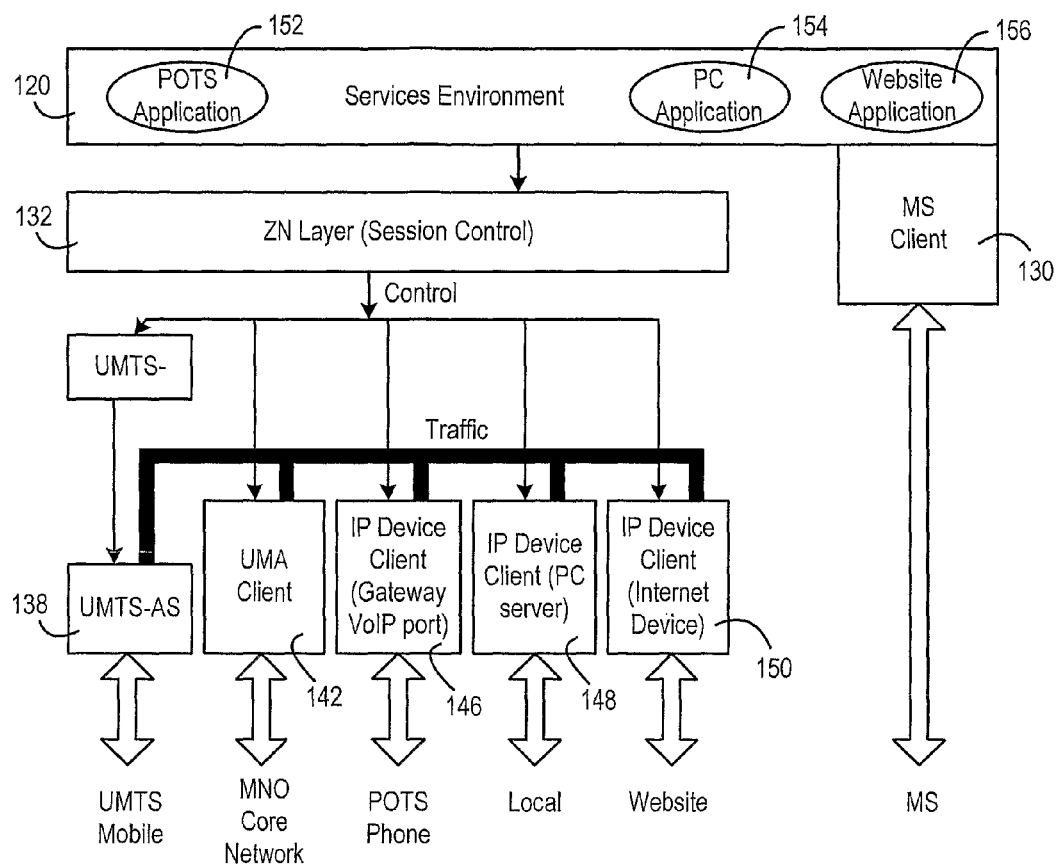
FIG. 4 is a diagram illustrating the interconnections enabled by the basestation in accordance with the present invention.

FIG. 4 is a schematic diagram, illustrating the traffic and control interconnections that are enabled, in one embodiment of the invention. In the embodiment illustrated in FIG. 4, the software includes three IP device clients, namely a first IP device client 146 that can connect through a VoIP port of the IP gateway 60 to a POTS phone 62, a second IP device client 148 that can connect over the LAN to a local PC or server 44, and a third IP device client 150 that can connect over the IP network 70 to a website on an internet device 72. The services environment 120 then includes a POTS application 152, a PC application 154 and a website application 156 corresponding to these three IP device clients. In such cases, it is also likely that application software, specific to the particular service, will be required in the device which is to be connected to, such as the IP gateway 60, the local PC 44, or the GSM/UMTS mobile device 30. Suitable application software can be provided by the MNO that operates the access point 50, in order to facilitate the desired overall service.

Applications operating within the services environment 120 are then able to initiate and terminate calls or data sessions with the mobiles camped on the access point 50 and the MNO core network 20 and, via the IP device clients, are able to access and control services within the gateway, devices connected to the Ethernet LAN and remote devices accessible via the Internet. The user is also able to interact with the management system 74 through the MS client 130.

The control of the initiation and termination of the "calls" or connections is handled by a Java application specific to the service which is executing within the access point 50 services environment. Functions provided within the API library (shown in FIG. 3 above) of the access point 50 permit call control and routing via session control implemented in the network layer 132 of the access point 50.

As mentioned above, the access point 50 performs the air interface ciphering, which is conventionally performed not in the base station of a cellular network, but in the core network. This means that the access point 50 is able to determine the type of call that is in progress. This in turn allows the access point 50 to provide additional services to a camped-on mobile device.

For example, applications running in the service environment can be used to supplement the capabilities of the mobile phones camped on to the access point 50. For example, legacy GSM and UMTS mobiles can take advantage of new service capabilities available through systems such as IMS, while they are camped onto the access point 50. The access point 50 can act as an interworking function or "proxy" between the new core network service platform and the legacy mobile device. For example, so called presence-based services which provide Instant Messenger (IM) functionality are planned to be available in future handsets as IMS is deployed in networks. However, the user will be required to replace their handset with a compatible device in order to make use of these services. An access point application can instead provide interworking between the legacy mobile device and the new core network presence services platform; the users "presence" on the network is indicated when the user's mobile roams onto the access point 50. Instant Messages sent to the user camped onto the access point 50 can be translated by the access point into conventional SMS messages, which are then transmitted to the user. Similarly, return SMS messages from the user camped onto the ZAP can be converted into other message formats for transmission back to the core network.

Another application of the same principle might be a "push-to-talk" capability, where the access point 50 provides an interworking function between a legacy mobile device and central call-servers within the MNO core network.

Thus, the services environment 120, located within a home or office based access point 50, effectively joins four distinct networks, namely the MNO Core Network 20 (via the IP gateway 60), the internet (again via the IP gateway 60), the local LAN (via the Ethernet port), and local mobile devices camped on the access point 50 (via a GSM or UMTS air interface).

For example, this allows various service options.

A direct connection can be made between GSM/UMTS mobile devices camped on the access point 50 and devices attached to the local Ethernet LAN network such as PCs/Servers, webcams and other home security and/or home automation sensors and actuators. This connection is local to the access point 50 and does not require the involvement of the MNO core network to carry the traffic.

A direct connection can be made between GSM/UMTS mobile devices camped on the access point 50 and the Internet without the need for MNO Core Network involvement. This allows GSM/UMTS mobile devices to access webpages and internet content without burdening the core network 20 with this traffic, and therefore has the advantage for the MNO that its infrastructure costs can potentially be lower.

A direct connection can be made between GSM/UMTS Mobile devices camped on the access point 50 and GSM/UMTS devices camped on other access points accessible directly via the Internet. This capability allows information such as presence of a user on their home access point 50 or voice/video calls to be conveyed directly from one access point to another access point over the Internet without the involvement of the MNO core network 20 in carrying the traffic.

A direct connection can be made between the MNO core network 20 and devices or applications within the IP gateway device 60 and other devices or applications connected to the local Ethernet LAN network. This capability would for example allow:

i. the VoIP/POTS port on the IP gateway device 60 to be used to make phone calls within the MNO network using the USIM card within the access point 50 to define the "mobile number" and other necessary details of the POTS phone;

ii. the IPTV port on the IP gateway device 60 to be used to display incoming video calls, mobile TV streams or MMS messages on the connected TV screen;

iii. a user, roaming in the MNO wide-area network, to access his home PC or server, or home security and/or automation devices attached to the local Ethernet LAN via his GSM/UMTS mobile device and the MNO core network 20 and MNO radio network 10.

The access point 50 can therefore provide improved services to users, while reducing costs for the mobile network operator.

The invention claimed is:

1. A base station for a cellular wireless communications network, comprising:

a first interface, enabling connection with a plurality of remote communications devices using a cellular wireless communications protocol in the cellular wireless communications network;

a second interface, enabling connection over a wide area network; and a third interface, enabling connection over a local area network to one or more local end devices, and further comprising:

software for enabling communication over the wide area network between the remote communications devices, connected to the first interface, and a core network of the cellular wireless communications network; and software for enabling communication over the local area network between the remote communications devices, connected to the first interface, and the one or more local end devices connected to the base station over the local area network, without passing traffic through the core network of the cellular wireless communications network;

a management node, which is able to define the or each device, connected to the local area network, with which the remote communications device connected to the first interface is able to communicate without passing traffic through the core network of the cellular wireless communications network, wherein the management node is able to specify channels of said cellular wireless communications network allocated to the base station.

2. The base station as claimed in claim 1, wherein the base station is able to perform ciphering of communications with the remote communications devices through the first interface.

3. The base station as claimed in claim 2, wherein the base station is able to perform interworking between a function available on the core network of the cellular wireless communications network and a remote communications device not enabled for that function, such that the remote communications device is able to access said function.

4. The base station as claimed in claim 2, wherein the base station is adapted to decipher messages received over the first interface from the remote communications devices in order to access data packets received therefrom, in order to be able to route said data packets as required.

5. A cellular wireless communications network, comprising the base station as claimed in claim 2, 3 or 4, and further including a management node, which is able to define the or each device, connected to the local area network, with which the remote communications device connected to the first interface is able to communicate without passing traffic through the core network of the cellular wireless communications network.

6. The base station as claimed in claim 1, wherein the base station has a public network identifier such that, when the public network identifier of the base station is called, all communications devices connected over the first interface are rung until one of them is answered.

7. The base station as claimed in claim 6, wherein the public network identifier is a MSISDN number.

8. A base station for a cellular wireless communications network, comprising:

a first interface, enabling connection with a remote communications device using a cellular wireless communications protocol in the cellular wireless communications network; and a second interface, enabling connection over a wide area network;

and further comprising:

software for enabling communication over the wide area network between the remote communications devices, connected to the first interface, and a core network of the cellular wireless communications network;

software for enabling communication over the wide area network between the remote communications devices, connected to the first interface, and a further device connected to the wide area network, without passing traffic through the core network of the cellular wireless communications network, and a management node, which is able to define the or each further device, connected to the wide area network, with which the remote communications device connected to the first interface is able to communicate without passing traffic through the core network of the cellular wireless communications network, wherein the management node is able to specify channels of said cellular wireless communications network allocated to the base station;

wherein the base station is able to perform interworking between a function available on the core network of the cellular wireless communications network and a remote communications device not enabled for that function, such that the remote communications device is able to access said function.

9. The base station as claimed in claim 8, wherein the base station is able to perform ciphering of communications with the remote communications device through the first interface.

10. The base station as claimed in claim 9, wherein the base station is adapted to decipher messages received over the first interface from the remote communications device in order to access data packets received therefrom, in order to be able to route said data packets as required.

11. The base station as claimed in claim 8, wherein the further device comprises a network computer, allowing data to be downloaded from said network computer to the remote communications device.

12. The base station as claimed in claim 8, wherein the further device comprises a further base station as claimed in claim 8.

13. The base station as claimed in claim 12, wherein said software enables communication over the wide area network between a remote communications device, connected to the first interface, and a further remote communications device connected to said further base station, without passing traffic through the core network of the cellular wireless communications network.

14. A cellular wireless communications network, comprising the base station as claimed in one of claims 9 and 10 to 13, and further including a management node, which is able to define the or each further device, connected to the wide area network, with which the remote communications device connected to the first interface is able to communicate without passing traffic through the core network of the cellular wireless communications network.

15. An access point, comprising:
a wireless interface, enabling connection with a mobile communications device using a cellular wireless communications protocol;
an interface for connection to a core network of a cellular wireless communications network; and
an interface for connection to the Internet, whereby a connection can be made over the Internet between a first mobile communications device camped on the access point and another mobile communications device camped on another access point, allowing the presence of a user on the access point to be conveyed to the other access point, and allowing a call between the first mobile communications device and the other mobile communications device, without the involvement of the core network of the cellular wireless communications network in carrying traffic.

16. The access point as claimed in claim 15, wherein the interface for connection to the Internet further allows the first mobile communications device to access internet content without passing traffic over the core network of the cellular wireless communications network.

17. An access point, comprising:
a wireless interface, enabling connection with a mobile communications device using a cellular wireless communications protocol;
an interface for connection to a core network of a cellular wireless communications network, the core network comprising a presence services platform, the presence services platform being able to provide presence-based services to compatible mobile communications devices;
whereby the access point is able to act as an interworking function between the core network presence services platform and an incompatible mobile communications device camped on the access point.

18. The access point as claimed in claim 17, wherein the presence of the user is indicated to the presence services platform when the incompatible mobile communications device roams onto the access point.

19. The access point as claimed in claim 17, wherein the presence services platform is able to provide an instant messenger functionality,
wherein the access point is able to receive instant messages sent to the incompatible mobile communications device, translate the received instant messages into SMS messages, and transmit the SMS messages to the incompatible mobile communications device.

20. The access point as claimed in claim 17, wherein the presence services platform is able to provide an instant messenger functionality,
wherein the access point is able to receive SMS messages from the incompatible mobile communications device, translate the received SMS messages into an instant message format, and transmit the translated messages to the core network.

21. An access point, comprising:
a wireless interface, enabling connection with a mobile communications device using a cellular wireless communications protocol;
an interface for connection to a core network of a cellular wireless communications network; and
a presence services platform, the presence services platform being able to provide presence-based services to compatible mobile communications devices;
whereby the access point is able to act as an interworking function between the presence services platform and an incompatible mobile communications device camped on the access point.

22. The access point as claimed in claim 21, wherein the presence services platform is able to provide an instant messenger functionality,
wherein the access point is able to receive instant messages sent to the incompatible mobile communications device, translate the received instant messages into SMS messages, and transmit the SMS messages to the incompatible mobile communications device.

23. The access point as claimed in claim 21, wherein the presence services platform is able to provide an instant messenger functionality,
wherein the access point is able to receive SMS messages from the incompatible mobile communications device, translate the received SMS messages into an instant message format, and transmit the translated messages to the core network.

* * * * *